(No Model.)   2 Sheets—Sheet 1.

S. BAIL.
HORSE DETACHER.

No. 372,287.   Patented Nov. 1, 1887.

WITNESSES:
John A. Ellis
C. Sedgwick

INVENTOR:
S. Bail
BY Munn & Co.
ATTORNEYS.

N. PETERS, Photo-Lithographer, Washington, D. C.

(No Model.) 2 Sheets—Sheet 2.

S. BAIL.
HORSE DETACHER.

No. 372,287. Patented Nov. 1, 1887.

WITNESSES:
John A. Ellis
C. Sedgwick

INVENTOR:
S. Bail
BY Munn & Co
ATTORNEYS.

UNITED STATES PATENT OFFICE.

SIMON BAIL, OF NEW YORK, N. Y.

HORSE-DETACHER.

SPECIFICATION forming part of Letters Patent No. 372,287, dated November 1, 1887.

Application filed January 21, 1887. Serial No. 225,017. (No model.)

*To all whom it may concern:*

Be it known that I, SIMON BAIL, of the city, county, and State of New York, have invented new and useful Improvements in Horse-Detachers, of which the following is a full, clear, and exact description.

My invention relates to devices for preventing accidents to carriages and injury or loss of life to the occupants thereof by unmanageable or runaway horses.

The invention consists in a novel combination of devices in a horse-detacher capable of operation by the driver or occupant of the vehicle, more especially adapted to one-horse vehicles, and in a combination, with the horse-detaching mechanism, of a special mechanism between it and a brake, substantially as hereinafter described, and pointed out in the claims.

Figure 1:
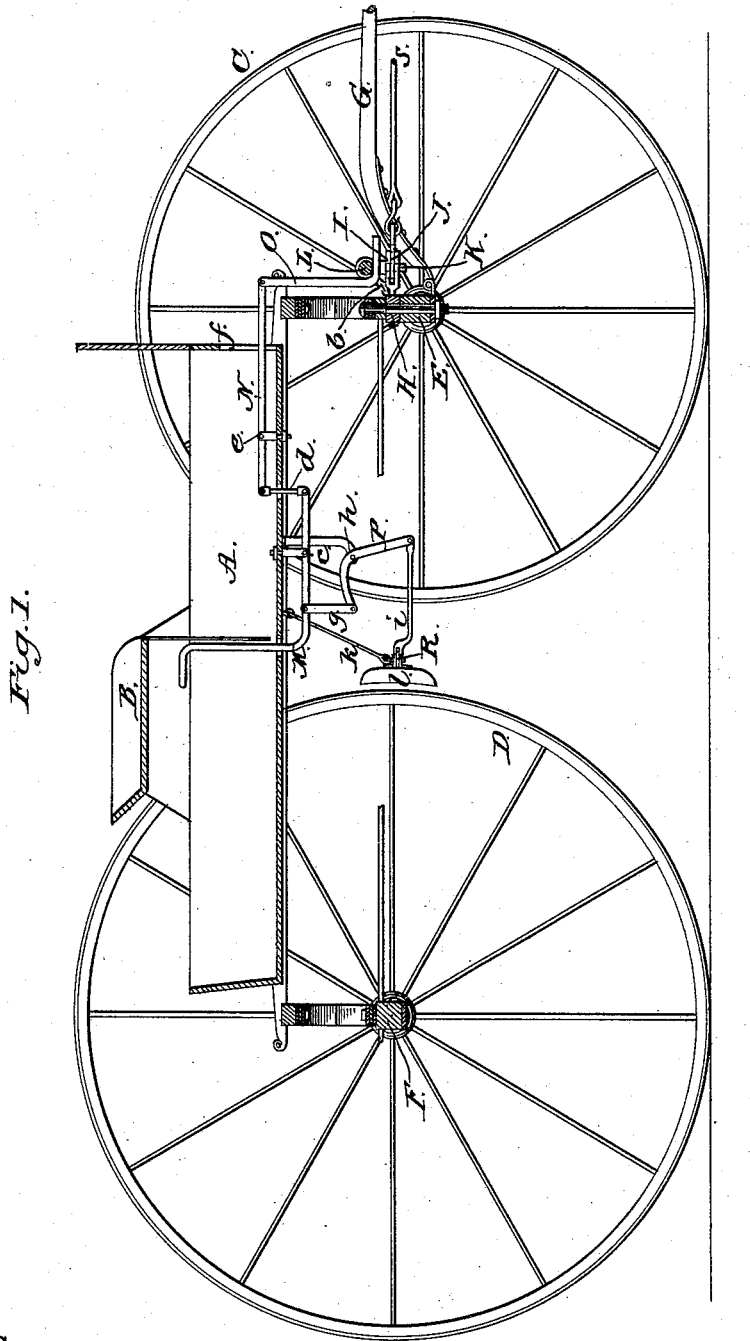
Figure 2:
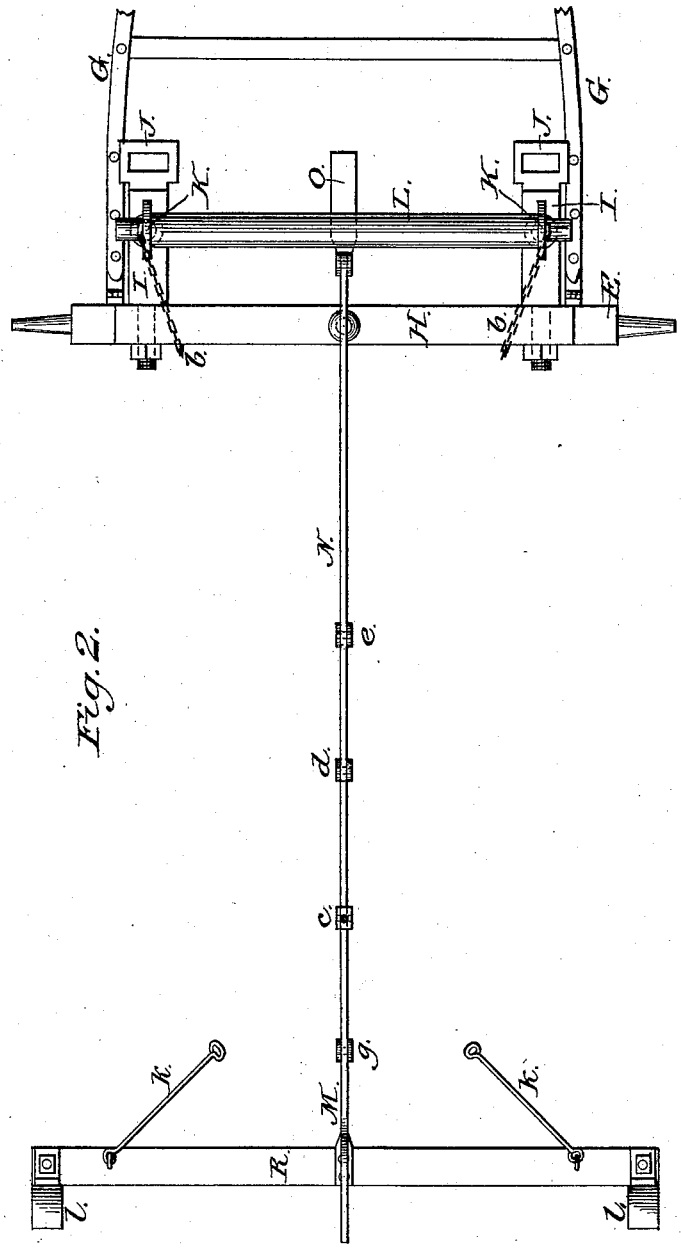

Figure 1 represents a vertical longitudinal and mainly central section of a side-bar buggy having my invention applied; and Fig. 2, a plan view, upon a larger scale, of the horse-detacher and brake removed from the buggy, but showing the front axle of the latter and a portion of the shafts.

Although the invention is here shown applied to a side-bar buggy, it is also applicable to other buggies and vehicles.

A indicates the body of the buggy, B its seat, and C D one of each of its front and hind wheels. E is its front axle, and F its rear one. G G are its shafts.

Connected with the front axle—as, for instance, by a bar, H, mounted thereon at opposite ends of said bar and between the shafts—are trace-holding irons I I. These irons, which have a forward projection relatively to the front axle, are constructed to receive within their front ends (here shown of jaw form for the purpose) detachable trace-links or loop-pieces J J, with which the traces *s* engage. Said trace-links or loop-pieces are engaged with the irons I I by pins K K at opposite ends of a cross-bar, L, and arranged to enter down within and through perforations in the irons I I and trace-links J J; but said pins K K are only freely fitted through these parts or devices, so that upon sufficiently lifting the cross-bar L the trace-links J J will be liberated from the irons I I, and thus the horse will be detached from the vehicle, leaving the detaching devices behind it and attached to the vehicle. Chains *b b* connect the cross-bar L with the bar H or other portion of the vehicle, to prevent detachment of said cross-bar from the vehicle when the pins K K are disengaged from the trace-links J J and irons I I.

When required to detach the horse, the cross-bar L is lifted by a lever mechanism under control of the driver or other occupant of the vehicle. Thus M is a hand-lever arranged to pass up under the seat B, so as to be within easy reach of the driver and out of the way, so far as any inconvenience is concerned. This lever, which is suitably bent, has its fulcrum *c*, which is intermediate of its length, preferably on the under side of the floor of the vehicle, and has its forward arm connected by a rod, *d*, with the rear arm of another advance lever, N, having its intermediate fulcrum at *e*, and having attached to the outer end of its forward arm a lifter, O, arranged to pass under the cross-bar L. By using compound levers M N the requisite motion is obtained to raise the lifter O, which, by its action on the cross-bar L on raising the back or handle end of the lever M, detaches the horse, as hereinbefore described, and by suitably arranging the fulcrums of said levers this is readily and quickly done without any very great or inconvenient exertion on part of the driver. In the drawings the lever N is shown as arranged above the floor of the vehicle and as passing through the dash-board *f;* but this is not absolutely necessary, and in other kinds of buggies or vehicles its passage through the dash-board will be avoided.

Connected with the horse-detaching mechanism—as, for instance, by a rod, *g*, with the hand-lever M—is another lever, P, having its fulcrum at *h* on a bracket attached to and projecting below the floor of the vehicle-body. This lever P is attached by a rod, *i*, to a brake-beam, R, hung on swinging rods *k k* from the floor of the vehicle, and carrying at or near its opposite ends brake-shoes *l l*, said beam and shoes constituting a brake in close relation with the rear wheels, D, of the vehicle, but not brought in contact with them till the lever M is manipulated or raised at its handle end to detach the horse, as described. When working the horse-detacher, however, to release the horse from the vehicle, the brake is, by the same motion of the hand-lever which controls or works the detacher, thrown into action upon the wheels of the vehicle, and may be held there after the horse has been released to arrest the motion of the vehicle.

I am aware that a brake has before been combined with a horse-detaching mechanism for simultaneously arresting the motion of the vehicle as the horse or horses are detached. This therefore I do not claim.

Having thus described my invention, what I claim as new, and desire to secure by Letters Patent, is—

1. In devices for detaching horses from vehicles, the combination, with the vehicle, of the trace-holding irons I I, the detachable trace-links or loop-pieces J J, the pins K K, adapted to engage and disengage said irons I and links J, the cross-bar L, connecting said pins, the lifter O, and lever mechanism for operating said lifter, substantially as specified.

2. The combination, with the body A of the vehicle, of the connected compound levers M N, the lifter O, the cross-bar L, freely attached to the vehicle, the engaging and disengaging pins K K, carried by said cross-bar, and the trace-links or loop-pieces J J, essentially as shown and described.

SIMON BAIL.

Witnesses:
WALTER E. BROWN,
C. G. BOLDENWECK.